(No Model.) 2 Sheets—Sheet 2.
R. MULHOLLAND.
SPRING VEHICLE.
No. 531,689. Patented Jan. 1, 1895.
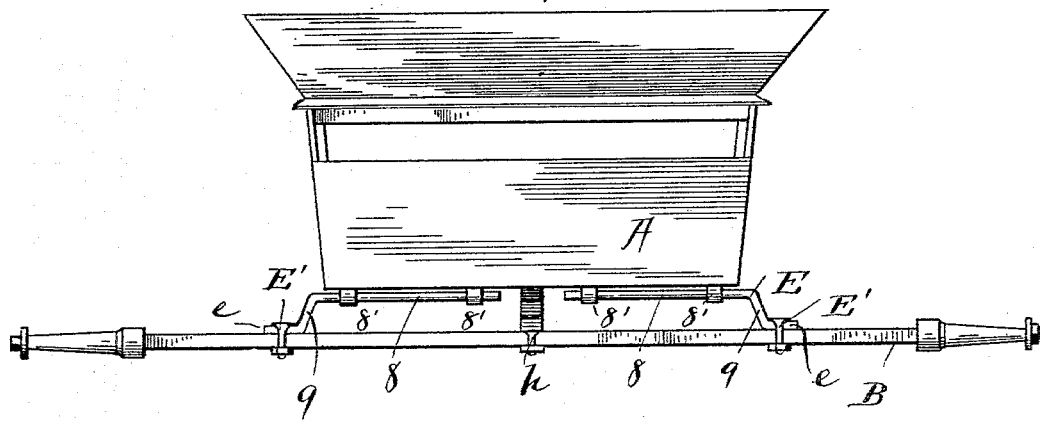
Fig. 3.
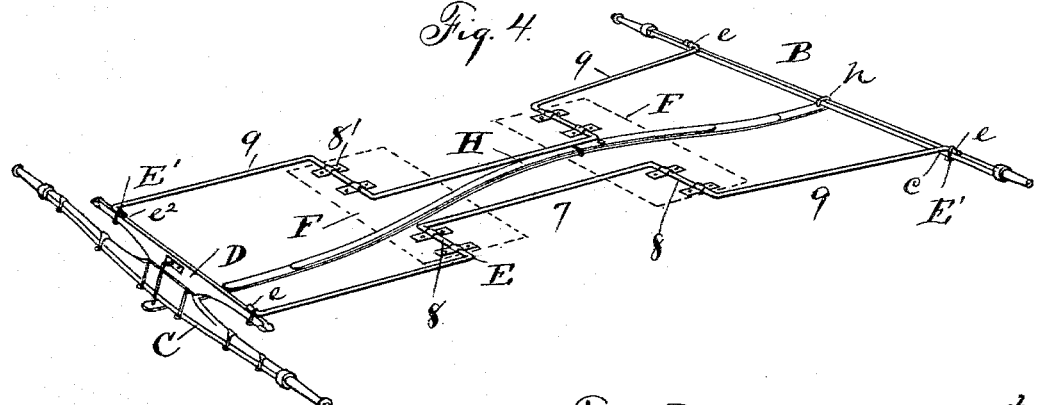
Fig. 4.
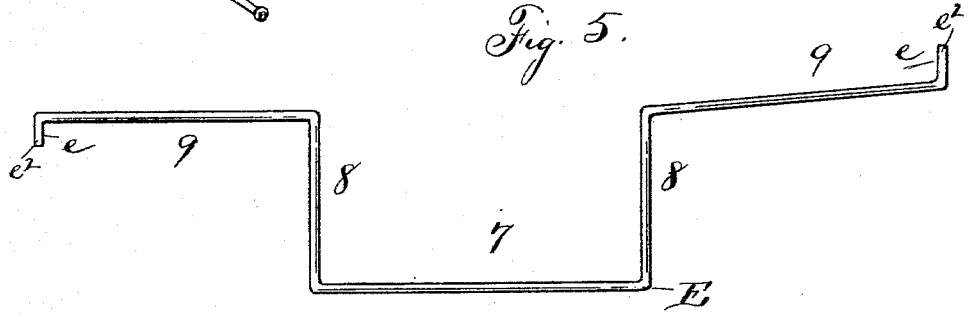
Fig. 5.
Fig. 6.
Witnesses.
E. Byron Gilchrist.
Inventor.
Richard Mulholland
By Leggett and Leggett
his Attorneys

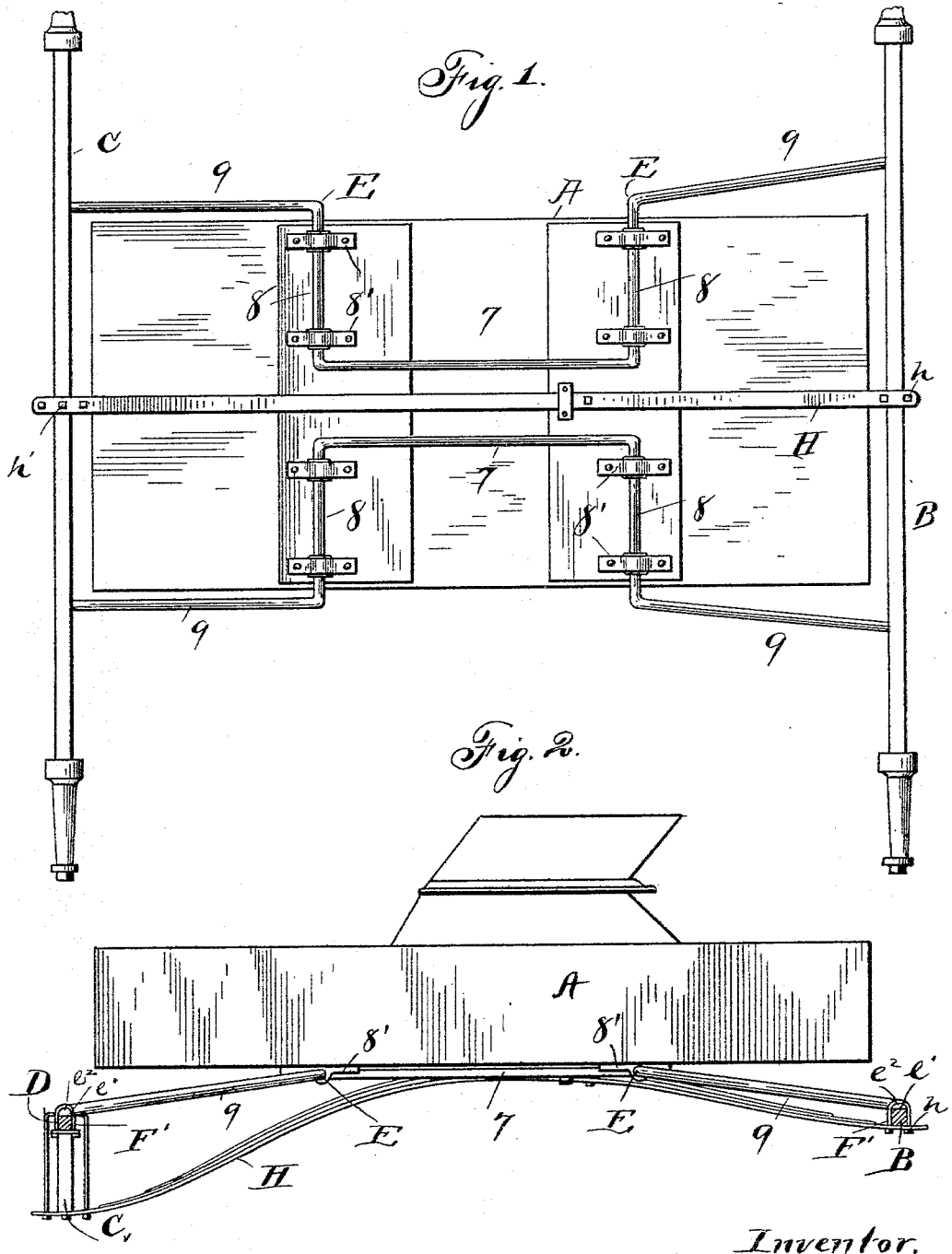

UNITED STATES PATENT OFFICE.

RICHARD MULHOLLAND, OF DUNKIRK, NEW YORK.

SPRING-VEHICLE.

SPECIFICATION forming part of Letters Patent No. 531,689, dated January 1, 1895.

Application filed December 31, 1891. Serial No. 416,700. (No model.)

*To all whom it may concern:*

Be it known that I, RICHARD MULHOLLAND, of Dunkirk, in the county of Chautauqua and State of New York, have invented certain new and useful Improvements in Spring-Vehicles; and I do hereby declare the following to be a full, clear, and exact description of the invention, such as will enable others skilled in the art to which it pertains to make and use the same.

My invention relates to improvements in vehicle-springs, more especially adapted for use in that class of vehicles wherein the springs form reaches for connecting and bracing the running-gear, and for providing means of attachment for the bed or platform; the object being to provide springs of such construction and arrangement relative to the body and running-gear of the vehicle as to constitute springs, reaches and braces, and at the same time to render the vehicle light, strong, cheap and elastic.

With this object in view, my invention consists in certain features of construction and in combination of parts, hereinafter described and pointed out in the claims.

In the accompanying drawings, Figure 1 is a bottom plan view of a vehicle-body, and a portion of the running-gear thereof provided with springs embodying my invention. Fig. 2 is a side elevation, partly in section, and Fig. 3 is a rear end elevation of the same. Fig. 4 is a perspective view of a portion of the running-gear of the vehicle having my improved springs attached. Figs. 5 and 6 are views in detail, hereinafter more fully described.

A represents the body of a vehicle; B, the rear axle; C, the front axle, and D the front bolster or head-block.

E E represent torsion springs, although a comparatively short section of said springs are actually subjected or act as torsion springs, as will hereinafter be shown. Said springs E E are each made of a continuous single rod or bar bent approximately to the form shown in the drawings, and each of said springs E E comprise a central and substantially rigid torsion section, 7, extending lengthwise of the vehicle, and transverse or torsional sections 8, 8, at right angles, or approximately at right angles to section 7 and end or vibrating-sections 9, 9. The sections 9, 9, may be, each of them, parallel or approximately so to the section 7, or, if desired, the section which is attached to the rear axle B, may be bent at the slight angle indicated in the drawings. The transverse or torsion sections 8 of the springs are journaled at or near each end in boxes or bearings secured to the bottom of the body of the vehicle, as at A', or, to an attachment of the body, such for instance, as spring-bars, F, shown in dotted lines, Fig. 4.

The end or vibrating-members 9 of my springs terminate, respectively, in a lateral-projection or arm, e, as shown in the drawings. The arms e extend substantially parallel to the axles or bolsters of the running-gear, to which they are attached. The arms or extensions e, that are attached to the rear axle or bolster B, are attached in a rigid manner; and in Fig. 2, the arms e are shown flat on one side, as at e', and rounding at the other side, as at e² and are secured to the axle or bolster B, by clips E'. The arms or extensions e that are attached to the front axle are not rigidly fixed thereto, but are confined between suitable journal-bearings, G, resting upon and fixed to the axle or bolster D. Clips E' secure the arms or extensions e to the front axle or bolster.

I provide a vehicle with two springs e, as indicated in the drawings, one at either side, and although it is not at all essential, there may, if desirable, be provided one or more leaf-springs to assist the springs e in sustaining the superimposed load.

H represents such a leaf-spring as I refer to. It is semi-elliptic and composed of one or more component parts or leaves, and one end of this spring is connected with the rear axle by a clip h, and the other is pivotally connected with the front axle, as shown at h'; while at or near its middle portion, the spring H may be bolted or otherwise secured to the body of the vehicle in any of the well known manners.

The arrangement, construction and peculiar mode of operation of the torsional springs E and especially the fact that said springs are each made from one piece and are continuous from end to end constitutes a very important feature of my invention.

By the construction which I have illustrated and described, the running-gear of the vehicle is firmly held together; the body of the vehicle is relieved of any undue strain from any twisting action of the transverse-sections of the springs, and the central section 7 will yield to the up-and-down movement or vibrations of the end-sections, 9, while all the torsional strain and function is confined to the sections 8, 8. The lateral arms or extensions *e* of the springs E also constitute a feature of my invention of no inconsiderable importance, as it is quite obvious that by this provision the springs E E may be secured to the bolsters or axles of the vehicle without in any way endangering or impairing their stability at their points of attachment, and preventing also any liability to a twisting or turning of the axles.

I am well aware of United States Patents No. 244,044, dated July 12, 1881, No. 342,160, dated May 16, 1886, and No. 427,665, dated May 13, 1890; and I neither find my invention to be embodied in the devices of any of said patents, nor do I seek or intend to so extend the scope of my invention as to include and cover any broad feature or principle disclosed in said patents.

In the Patent No. 244,044, while there is therein shown springs consisting of a single continuous metallic piece extending from front to rear of the vehicle, and while a torsion spring is also shown, the two sections of said continuous metallic piece which are subjected to, and act as a torsion spring, are not, as in my device, sections that extend crosswise of the vehicle-body, but longitudinally or lengthwise of the body; and I consider my arrangement, as shown herein, to be an improvement over that shown in said Patent No. 244,044, in that there is materially less strain brought upon the vehicle-structure, due to the torsional strain on the springs, and this improvement of mine resides, largely, in such a construction as I have herein shown, whereby the torsion-spring sections 8, 8, of my springs, E, are made to extend crosswise of the vehicle-body.

In said Patent No. 342,160, there is shown an arrangement of springs not only materially more complicated than that which I have herein disclosed, but there is no torsional action whatever intended or accomplished in the springs of said Patent No. 342,160. In said patent the spring-pieces there shown have, each of them, two sections that extend crosswise of the vehicle-body;—but these sections are not torsion springs, nor can they act, nor are they designed or intended to act as torsion-springs. These crosswise sections of the springs of Patent No. 342,160 are coil-springs. A torsion-spring exerts its function on account of a bodily twisting—not a bending of said spring;—and a coil spring never so acts, when it is operated as shown in said Patent No. 342,160, wherein the coil-spring sections are given a winding-up and unwinding movement only. If a coil-spring is compressed or drawn out longitudinally, as common in weighing-scales, and bird-cage hangers, then there is more or less of a torsion strain exercised on a coil spring; but when such a spring is employed as it only can be in such an application as shown in the device of said Patent No. 342,160, the metal is given a simple bending, and not a twisting strain, and, therefore, cannot act as a torsion-spring; and it is because the springs of said patent are only bending or vibrating-springs, that the bulky and comparatively unsightly coils are necessary. In my invention I entirely dispense with these coils, and accomplish better results, save expense, and obtain a structure more desirable in every way.

In said Patent No. 427,665 there is also shown two side-springs that have what are there called "offsets" in their middle portion; but the inventor in said patent distinctly states that "the springs thus made with the offsets successfully brace the body against endwise shucking and there is no torsion action in said springs." It, therefore, plainly appears that while the side-springs of Patent No. 427,665 in their shape bear a slight resemblance to the shape of my springs, they are, in fact, radically different in function and operation according to the plainly-expressed declaration of their inventor, as above quoted from said Patent No. 427,665.

Having thus analyzed, and compared with mine, such prior devices as may be said to bear more or less of an analogy to my invention herein disclosed, and having pointed out the material differences and improvements characterizing my said invention, and having specifically and fully described said invention,

What I claim is—

1. A vehicle spring constructed of a single and continuous rod or bar connected with the rear axle and front bolster, and having two transverse torsion sections between the ends, in combination with a longitudinally arranged semi-elliptic spring, connecting the body with the front and rear axles, substantially as shown and described.

2. The combination in the vehicle running gear of a spring consisting of a continuous bar or rod formed with a central longitudinal section, two transverse torsional sections journaled in bearings on the bottom of the vehicle body, end vibrating sections with longitudinally arranged semi-elliptic spring connecting the front and rear axle and body substantially as shown and described.

In testimony whereof I sign this specification, in the presence of two witnesses, this 5th day of December, 1891.

RICHARD MULHOLLAND.

Witnesses:
C. H. DORER,
WARD HOOVER.